(12) United States Patent
Thakker

(10) Patent No.: US 10,198,417 B2
(45) Date of Patent: Feb. 5, 2019

(54) SYSTEMS AND METHODS TO INPUT OR ACCESS DATA USING REMOTE SUBMITTING MECHANISM

(71) Applicant: Mitesh L. Thakker, Mumbai (IN)

(72) Inventor: Mitesh L. Thakker, Mumbai (IN)

( * ) Notice: Subject to any disclaimer, the term of this patent is extended or adjusted under 35 U.S.C. 154(b) by 926 days.

(21) Appl. No.: 14/405,443

(22) PCT Filed: Apr. 5, 2013

(86) PCT No.: PCT/IB2013/052726
§ 371 (c)(1),
(2) Date: Dec. 4, 2014

(87) PCT Pub. No.: WO2013/150492
PCT Pub. Date: Oct. 10, 2013

(65) Prior Publication Data
US 2016/0062971 A1 Mar. 3, 2016

(30) Foreign Application Priority Data
Apr. 5, 2012 (IN) .......................... 1118/MUM/2012

(51) Int. Cl.
*G06F 17/24* (2006.01)
*G06F 3/0484* (2013.01)
(Continued)

(52) U.S. Cl.
CPC ........ *G06F 17/243* (2013.01); *G06F 3/04842* (2013.01); *G06F 3/167* (2013.01);
(Continued)

(58) Field of Classification Search
None
See application file for complete search history.

(56) References Cited

U.S. PATENT DOCUMENTS 6,199,079 B1 * 3/2001 Gupta ................ G06F 17/2247
707/999.006
7,689,832 B2 * 3/2010 Talmor ................... G06F 21/32
713/186
(Continued)

OTHER PUBLICATIONS

International Search Report and Written Opinion—PCT/IB2013/052726.

*Primary Examiner* — Yongjia Pan
(74) *Attorney, Agent, or Firm* — D'Ambrosio & Menon, PLLC; Usha Menon

(57) ABSTRACT

Systems and methods for data entering and submission for an online interface using a remote entering/submitting mechanism, said system comprising:
a. at least one data entry field in an online interface;
b. a remote entering/submitting mechanism comprising:
  i. a pointer generating or retrieving system adapted to generate a pointer data to be displayed on the online interface;
  ii. a central interface system adapted to receive a communication linked to a pointer data from an electronic device;
  iii. a pre-populated database comprising one or more pointer data which are pre-defined; and
  iv. a central database adapted to store correlative information in relation to one or more pre-defined pointer data; and
c. a submission component capable of submitting data after receiving the communication from the electronic device.

23 Claims, 2 Drawing Sheets

Figure 1:
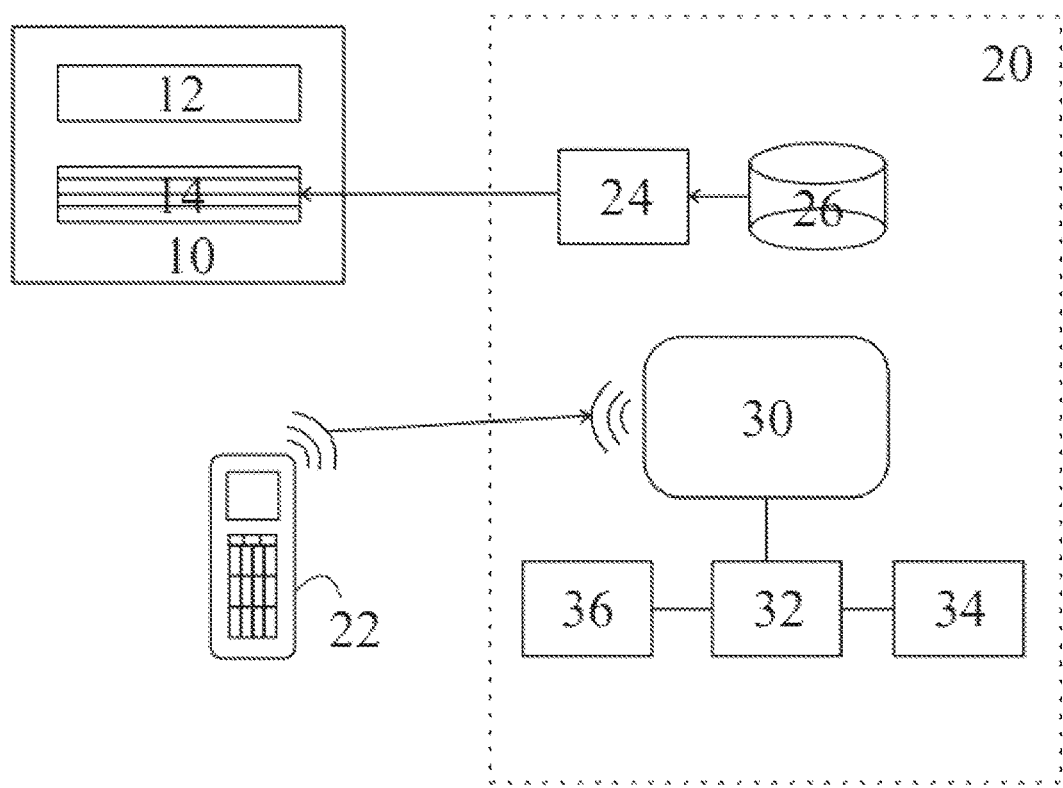

(51) Int. Cl.
*G06F 21/32* (2013.01)
*G06F 21/34* (2013.01)
*G06F 21/42* (2013.01)
*G06F 3/16* (2006.01)
*G06F 17/30* (2006.01)

(52) U.S. Cl.
CPC .......... *G06F 17/3012* (2013.01); *G06F 21/32* (2013.01); *G06F 21/34* (2013.01); *G06F 21/42* (2013.01); *G06F 2221/2133* (2013.01)

(56) References Cited

U.S. PATENT DOCUMENTS

| | | | |
|---|---|---|---|
| 7,953,597 B2 * | 5/2011 | Ativanichayaphong | G06F 17/243 704/235 |
| 8,307,412 B2 * | 11/2012 | Ozzie | G06F 21/35 713/155 |
| 8,620,365 B2 * | 12/2013 | Hunziker | H04W 12/10 370/352 |
| 8,650,103 B2 * | 2/2014 | Wilf | G06F 21/33 705/35 |
| 8,832,806 B2 * | 9/2014 | Ozzie | G06F 21/35 713/155 |
| 8,924,310 B2 * | 12/2014 | Bishop | G06Q 20/341 705/76 |
| 9,355,231 B2 * | 5/2016 | Disraeli | G06F 21/31 |
| 9,652,802 B1 * | 5/2017 | Kasower | G06Q 40/00 |
| 2002/0006803 A1 * | 1/2002 | Mendiola | H04L 29/12009 455/466 |
| 2003/0115060 A1 * | 6/2003 | Junqua | G10L 15/24 704/235 |
| 2003/0120626 A1 * | 6/2003 | Piotrowski | G06F 17/30663 |
| 2004/0039990 A1 * | 2/2004 | Bakar | G06F 17/243 715/222 |
| 2005/0096906 A1 * | 5/2005 | Barzilay | G06Q 30/06 704/249 |
| 2006/0059434 A1 * | 3/2006 | Boss | G06F 17/243 715/780 |
| 2006/0070126 A1 * | 3/2006 | Grynberg | G06F 21/6263 726/22 |
| 2006/0074652 A1 * | 4/2006 | Ativanichayaphong | G06F 17/243 704/235 |
| 2006/0153346 A1 * | 7/2006 | Gonen | H04L 63/08 379/88.17 |
| 2007/0168677 A1 * | 7/2007 | Kudo | G06F 21/34 713/185 |
| 2008/0115198 A1 * | 5/2008 | Hsu | G06F 21/31 726/5 |
| 2008/0288299 A1 * | 11/2008 | Schultz | G06Q 30/06 705/4 |
| 2009/0006202 A1 * | 1/2009 | Alroy | G06Q 30/0269 705/14.66 |
| 2009/0328149 A1 * | 12/2009 | Lyons | G06F 17/243 726/3 |
| 2010/0037303 A1 * | 2/2010 | Sharif | G06F 21/31 726/6 |
| 2011/0119276 A1 * | 5/2011 | Borghetti | G06Q 10/10 707/748 |
| 2012/0297190 A1 * | 11/2012 | Shen | H04L 9/0866 713/168 |
| 2013/0139239 A1 * | 5/2013 | Jillings | H04L 63/12 726/7 |
| 2013/0282589 A1 * | 10/2013 | Shoup | G06F 21/34 705/67 |
| 2014/0067980 A1 * | 3/2014 | La Rotonda | G06Q 10/10 709/206 |
| 2015/0046969 A1 * | 2/2015 | Abuelsaad | G06F 21/41 726/1 |
| 2015/0106900 A1 * | 4/2015 | Pinski | H04L 63/0876 726/7 |
| 2015/0227730 A1 * | 8/2015 | Grigg | G06F 21/31 726/7 |
| 2015/0319613 A1 * | 11/2015 | Shmilov | H04W 12/06 |
| 2016/0012464 A1 * | 1/2016 | Bryant, III | G06Q 30/0214 705/14.16 |
| 2016/0269385 A1 * | 9/2016 | Siddiqui | H04L 63/08 |

* cited by examiner

SYSTEMS AND METHODS TO INPUT OR ACCESS DATA USING REMOTE SUBMITTING MECHANISM

FIELD OF THE INVENTION

This invention relates to the field of data transmission systems, authentication and encryption systems. Particularly, this invention relates to a system and method for data entering and submission for an online interface using a remote entering/submitting mechanism. Particularly, this invention also relates to an encryption system and method adapted to encrypt communication. Particularly, this invention also relates to a system and method for tracking a user using a system for data entering and submission for an online interface using a remote entering/submitting mechanism.

BACKGROUND OF THE INVENTION

Data communication and data transfer systems envelope the entire spectrum of telecommunication and Internet based communication. The term, 'data', incorporates the use of text data, voice data, multimedia data, and the like all forms of data. In the present digital age a person has access to at least one mode of communication, which is the channel of communication. The person, hence, has access to at least a single node or device for accessing or using such channel of communication through such mode of communication. This access to at least a single node of device may be a shared access such as a public access or an unshared access such as a private access.

For personal, business, professional, or any other reason, effective and safe data communication and data transfer is the order of the current digital era. E.g. a telephone facilitates voice data transfer from one telephone node to another telephone node over a telecommunication mode of communication. An Internet connected computer system facilitates text, voice, and multimedia data transfer from one computer node to another computer node over an Internet mode of communication. This computer node includes interfaces which allow a user to log-on so as to have a secure mode of communication. This may be an instant messaging system, an e-mail system, a P2P system, a VoIP system, or the like.

For each of these online interfaces, data entry systems are required. In most cases, a two-level data entry system is required. A first level of data entry system is for signing up so as to allow repetitive usage of the system in an authorized and secure manner. In the first level of data entry, the entered data is stored (securely) at a remote location. A second level of data entry system is for using the previously signed-up information (or its portion) (i.e. the first level of entered data) to gain entry for usage of the system. This second level of data entry is typically an authorization mechanism. Data entry systems in online interfaces typically incorporate the use of text fields and an enter/accept/submit mechanism which facilitates submission of data entered in the text fields. Thus, when a user intends to enter/submit any information, the submit mechanism is triggered. Submit mechanism known in the art, more particularly in network based systems, comprise of user enabled submission, such as but not limited to a mouse enabled clicking of submit button or a keyboard enabled input system, typically the use of the 'enter' key on the keyboard. In each of the aforementioned cases, the submission is specifically carried out by an active input for direct submission from the user, and none of the known systems allow for a user to trigger a remote submission mechanism which enables the submission of data intended to be submitted/entered by such user, without the user having to specifically carry out an active input for direct submission.

Further, the entered first level of data is ordinarily personal data and needs to be stored securely. Further, second level of data which allows subsequent authorization or entry via an online interface also needs to be secure from hackers or scrupulous entities or spyware or malware entities. Hence, there is a need for a secure encryption and authorization mechanism which facilitates the provisioning of a secure environment.

Even though, this data stored securely is secure data, it is comprehensively used by many companies and web-entities for user-specific purposes such as targeted advertisements. The entered data is a sample of demographic data. And hence, is crucial for many data analytic purposes.

Furthermore, in the field of marketing, advertising, telemarketing, and the like, before the incorporation of Do-Not-Disturb (DND) services by telecommunication service providers, telemarketers could call up phone owners in order to telemarket their product or services. However, with regulations in place in relation to DND services, it has become increasingly difficult for the marketing industry to target potential customers or clients or users. Hence, there is a need for a system which initiates proactive calling from a user or customer or client in a secure and warranted manner.

Online mechanisms include advertisements which target potential users, customers, clients or the like. These advertisements may be placed at various locations such as search engines pages, social media sites, private websites or the like. Each advertisement attracts fees from the host site. However, in the event that an advertisement generates potential leads, an advertiser rarely comes to know the source of the advertisement or the placement of the advertisement which has led to the generation of potential lead(s). Hence, there is a need for a system which provides such information for the purposes of statistics and analytics.

OBJECTS OF THE INVENTION

An object of the invention is to provide a system and method for data entering and submission for an online interface using a remote entering/submitting mechanism.

Another object of the invention is to provide a system and method for tracking a user using a system for data entering and submission for an online interface using a remote entering/submitting mechanism.

Yet another object of the invention is to provide a system and method for data entering and submission for an online interface using a remote entering/submitting mechanism and a biometric identity system.

Still another object of the invention is to provide a system and method for data entering and submission for an online interface using a remote entering/submitting mechanism in an encrypted and authorized manner.

An additional object of the invention is to provide a system and method for tracking a user using a system for data entering and submission for an online interface using a remote entering/submitting mechanism in an encrypted and authorized manner.

SUMMARY OF THE INVENTION

According to this invention, there is provided a system and method for data entering and submission for an online interface using a remote entering/submitting mechanism.

According to this invention, there is provided a system and method for tracking a user using a system for data entering and submission for an online interface using a remote entering/submitting mechanism.

According to this invention, there is provided a system and method for data entering and submission for an online interface using a remote entering/submitting mechanism and a biometric identity system.

According to this invention, there is provided a system and method for data entering and submission for an online interface using a remote entering/submitting mechanism in an encrypted and authorized manner.

The system and method of this invention is a new online approach to data submission, user or data authentication with the following key features:

1. The invention aims to provide the user systems and methods for 'Allowing a user to input or submit data into a form or a data input interface on an online interface by way of an offline communication made through a separate communication device.' The offline communication made is preferably a phone call, but may suitably be replaced by a convenient substituent mode of communication such as but not limited to SMS or email.
2. The invention also includes a feature of using a mode of user/data authentication or verification, using biometric identity related code of a user, which is preferably voice based ID.
3. The authentication process may further be subjected to a process of encryption, for added security to the said process.

According to an embodiment of the invention, there is a system for data entering and submission for an online interface using a remote entering/submitting mechanism, said system comprising:
  a. at least one data entry field in an online interface;
  b. a remote entering/submitting mechanism comprising:
    i. a pointer generating or retrieving system adapted to generate a pointer data to be displayed on the online interface;
    ii. a central interface system adapted to receive a communication linked to a pointer data from an electronic device;
    iii. a pre-populated database comprising one or more pointer data which are pre-defined; and
    iv. a central database adapted to store correlative information in relation to one or more pre-defined pointer data; and
  c. a submission component capable of submitting data after receiving the communication from the electronic device;
    wherein the data is submitted by the submission component, when a user communicates a pointer data displayed on the online interface to the central interface system via the electronic device; and
  wherein there is no clickable submit button on the online interface;
  and wherein there is no other means of allowing a user to enter/submit the data on the said online interface;
  and wherein data shall not be submitted by the submission component unless the pointer data has been communicated to the central interface system by the user using the electronic device through a medium/interface other than the said online interface.

According to this invention, there is a system for data entering and submission for an online interface using a remote entering/submitting mechanism, said system comprising:
  a. at least one data entry field in an online interface system;
  b. remote entering/submitting mechanism comprising a device for facilitating the remote entry or remote submission;
  c. remote entering/submitting mechanism further comprising a pointer generating system adapted to generate pointer data to be displayed on the online interface system;
  d. pre-populated database comprising pointer data which are pre-defined for the use of the system of this invention;
  e. remote entering/submitting mechanism still further comprising a central interface system adapted to receive communication from the device in response to generated pointer data;
  f. central interface system further comprising an acknowledgement means adapted to acknowledge communication from a device in relation to a generated pointer; and
  g. remote entering/submitting mechanism additionally further comprising a central database adapted to store correlative information in relation to various types of pre-defined pointer data.

According to this invention, there is also provided a method for data entering and submission for an online interface using a remote entering/submitting mechanism, said method comprising the steps of
  a. entering data in a data entry field in an online interface system by a user;
  b. generating or retrieving a pointer data by a pre-populated database to be displayed on the online interface system;
  c. displaying the pointer data on the online interface system;
  d. receiving a communication linked to a pointer data from an electronic device, by a central interface system; and
  e. submitting data after receiving the communication from the electronic device by a submission component;
  wherein there is no clickable submit button on the online interface;
  and wherein there is no other means of allowing a user to enter/submit the data on the said online interface;
  and wherein data shall not be submitted by the submission component unless the pointer data has been communicated to the central interface system by the user using the electronic device through a medium/interface other than the said online interface.

According to this invention, there is also provided a method for data entering and submission for an online interface using a remote entering/submitting mechanism, said method comprising the steps of:
  a. entering data in a data entry field in an online interface system by a user;
  b. providing a remote entering/submitting mechanism comprising a device for facilitating the remote entry or remote submission;
  c. generating/retrieving pointer data to be displayed on the online interface system;
  d. pre-populating a database comprising pointer data which are pre-defined for the use of the method;

e. receiving communication from the device in response to generated pointer data;
f. acknowledging communication from a device in relation to a generated pointer; and
g. storing correlative information in relation to various types of pre-defined pointer data.

According to this invention, there is also provided an encryption system and method adapted to encrypt communication employed with the system for data entering and submission for an online interface using a remote entering/submitting mechanism, said system comprising:
 a. a first input means adapted to allow a user to input an identity;
 b. a second input means adapted to allow an input of a voice data in the user's own voice;
 c. a unique code generation means adapted to generate a unique code whenever a user generates a request for communication, said unique code is being generated by an encryption algorithm which receives the first input data and the second input data, said unique code being a derivative of the first input data and the second input data in correlation with the parameters defined by the encryption algorithm for encrypting;
 d. a database of generated unique codes in encrypted manner in order to reference a user for all authorization;
 e. a computation means adapted to create/retrieve a verification code in accordance with the code that is to be received from the user for the purpose of matching; and
 f. a matching means for matching the input data or verification code created by the computation means.

In an embodiment of this invention, the second input means is adapted to allow an input of a data other than voice data such as but not limited to a pin, a code, an OTP or a T-Pin.

According to this invention, there is provided a method for data entering and submission for an online interface using a remote entering/submitting mechanism, wherein said method further comprises a method adapted to encrypt communication comprising the steps of:
 a. inputting an identity as a first input data by a user by a first input means;
 b. inputting a voice data in the user's own voice as a second input data by a second input means;
 c. generating a unique code by a unique code generation means whenever the user generates a request for a communication, said unique code being generated by an encryption algorithm which receives the first input data and the second input data, said unique code being a derivative of the first input data and the second input data in correlation with parameters defined by the encryption algorithm for encrypting;
 d. storing the generated unique codes in encrypted manner in order to reference a user for all authorization in a database;
 e. creating/retrieving a verification code in accordance with the code that is to be received from the user for purposes of matching by a computation means; and
 f. matching the verification code or first input data by a matching means.

According to this invention, there is also further provided an encryption method and method adapted to encrypt communication, said method comprising the steps of:
 a. a first step of allowing a user to input an identity;
 b. a second step of allowing a user to input a voice data in the user's own voice;
 c. generating a unique code whenever a user generates a request for communication, said unique code being generated by an encryption algorithm which receives the first input data and the second input data, said unique code being a derivative of the first input data and the second input data in correlation with the parameters defined by the encryption algorithm for encrypting;
 d. storing generated unique codes in encrypted manner in order to reference a user for all authorization; and
 e. creating a verification code in accordance with the code that is to be received from the user for the purposes of matching.

According to this invention, there is also further provided a computer program product for data entering and submission for an online interface using a remote entering/submitting mechanism, the computer program product embodied in a computer readable medium that, when executing on a computer, performs steps comprising
 a. entering data in a data entry field in an online interface system by a user;
 b. providing a remote entering/submitting mechanism comprising a device for facilitating the remote entry or remote submission;
 c. generating/retrieving pointer data to be displayed on the online interface system;
 d. pre-populating a database comprising pointer data which are pre-defined for the use of the method;
 e. receiving communication from the device in response to generated pointer data;
 f. acknowledging communication from a device in relation to a generated pointer; and
 g. storing correlative information in relation to various types of pre-defined pointer data.

DETAILED DESCRIPTION OF THE INVENTION

According to this invention, there is provided a system and method for data entering and submission for an online interface using a remote entering/submitting mechanism.

FIG. 1 illustrates a schematic of the system for data entering and submission for an online interface using a remote entering/submitting mechanism.

In accordance with an embodiment of this invention, there is provided at least one data entry field (12) in an online interface system (10). The entry mechanism to the data entry field is a routine entry mechanism selected from a group of devices comprising a keyboard, a mouse, a gesture device, a touch interface device, a pointer device, a stylus and interface device, and the like.

In accordance with another embodiment of this invention, there is provided a remote entering/submitting mechanism (20). This remote entering/submitting mechanism includes or involves a device (22) for facilitating the remote entry or remote submission. This device may be one selected from a group consisting of a phone, a cell phone, a mobile phone or any phone or telecommunication enabled data entry device or any Internet enabled data entry device or any wireless communication based data entry device or wired communication based data entry device.

In accordance with another embodiment of this invention, the device (22) may be the same as the device used for facilitating the entry mechanism to the at least one data entry field (12) in an online interface (10).

In accordance with another embodiment of this invention, the device (22) may not be the same as the device used for facilitating the entry mechanism to the at least one data entry field (12) in an online interface (10).

In accordance with another embodiment of this invention, the remote entering/submitting mechanism (20) comprises a pointer generating system (24) adapted to generate or retrieve pointer data (14) to be displayed on the online interface system (10). This pointer data for example may be a telephone number to which a call is to be made or a number to which a message is to be sent or an identity to which internet based or telecommunication based data is to be sent from the device (22). This pointer is generated or selected from a list of numbers, selected from a pre-populated database (26), which are pre-defined for the use of the system of this invention. This pointer may also be generated or selected from a list of identities (such as e-mail identities or messaging identities), selected from a pre-populated database (26), which are pre-defined for the use of the system of this invention. The 'pointer' may be a combination of alphanumeric characters or other symbols which may represent a specific identifiable characteristic such as but not limited to a telephone number, a mobile number, SMS Keyword, Short Code, extension number, numerical input after connecting to a call, email ID, PIN (personal identification number), TIN (Telephone Identification Number), a URL (uniform resource locator), or a combination thereof. The pointer or pointer data may also be a coded means such as but not limited to a QR code (Quick Response Code), a hint or secret question, a captcha enabled access, an image, a sound or music based communication, a puzzle or a hint statement.

In accordance with another embodiment of this invention, a pointer may be distinct and unique in association to a pointer parameter, such that a pointer is used to indicate and identify the pointer parameter. The pointer parameter for example may be the particular webpage where the pointer is displayed, geographical location of a user, time of display and other such identifiable parameters which are particularly used for user tracking or user verification or user authentication. The pointers may be continuously distinct in association to a pointer parameter or may be reused or recycled from time to time or in the form of sessions, such that at a given instant of time or session every pointer is unique to a pointer parameter irrespective of whether the pointer was associated to the same or different pointer parameter in a previous period of time or session, which is not valid or live at the said given instant of time or session.

In accordance with yet another embodiment of this invention, the remote entering/submitting mechanism (20) comprises a central interface system (30) adapted to receive communication from the device (22) in response to generated pointer data. The central interface system (30) may further comprise an acknowledgement means (32) adapted to acknowledge communication from a device (22) in relation to a generated pointer. This acknowledgement means may include an Interactive Voice Response means. Interactive Voice Response (IVR) is an electronic system that provides voice response to a user's query initiated via telephone and any remote communication device. Conventional IVR solution comprises a computer with IVR software. The acknowledgement means may include a means (34) for prompting a user to annunciate a data, preferably a text data. The text data may be any random text data generated by the system or may be a voice captcha or the like. Further, it may include a biometric identity system (36) adapted to recognize voice of a user for acknowledging submission. It is to be understood that the biometric identity system is trained during initialization to recognize a user's voice and the trained set of data and parameters is securely stored and recalled as and when the biometric identity system (36) of a recognized or pre-registered user is activated.

In accordance with still another embodiment of this invention, the remote entering/submitting mechanism (20) comprises a central database (26) adapted to store correlative information in relation to various types of pre-defined pointer data. According to a non-limiting exemplary embodiment, a first type of pointer data may relate to a pre-defined mobile number for acknowledgement means (32), said first type of pointer data adapted to be generated if a user lands on the online interface by directly typing in the URL of the online interface in a browser's address bar. According to a non-limiting exemplary embodiment, a second type of pointer data may relate to a pre-defined mobile number for acknowledgement means (32), said second type of pointer data adapted to be generated if a user lands on the online interface by clicking on an advertisement on any web-site, mobile site, mobile app or search engine results' page or any digital property connected via internet, intranet or network. According to a non-limiting exemplary embodiment, a third type of pointer data may relate to a pre-defined mobile number for acknowledgement means (32), said third type of pointer data adapted to be generated if a user lands on the online interface by clicking an advertisement on another webpage. According to a non-limiting exemplary embodiment, a fourth type of pointer data may relate to a pre-defined e-mail identity for acknowledgement means (32), said fourth type of pointer data adapted to be generated if a user lands on the online interface by directly typing in the URL of the online interface in a browser's address bar. Such and further various types of pointer data may be defined and stored in the central database (26) so that information in relation to usage for data analytics and statistics may be collated. Further, various data analytic means and various statistical and correlation means may be employed in relation to the various embodiments of the system and method of this invention.

In accordance with an embodiment of the invention, the submission of data enabled by submission component is enabled and said data is submitted to a data submission server.

In accordance with still another embodiment of this invention, a single server or a central server may comprise one or more databases of the current system.

In accordance with an embodiment of the invention, data submission server may or may not be a part of a central server.

In accordance with an embodiment of the invention, the pointer or pointer data may be same for multiple sessions simultaneously.

In accordance with an embodiment of the invention, the pointer or pointer data may be different for each of multiple sessions simultaneously.

In accordance with an embodiment of this invention, the said system further comprises of a system for allowing a user to input or submit data into a form or a data input interface on an online interface by way of an offline communication made through a separate communication device, wherein the offline communication made is a communication selected from a group comprising a phone call, an SMS, an MMS, electronic communication, a an email, and a combination thereof.

In accordance with an embodiment of this invention, the method for data entering and submission for an online interface using a remote entering/submitting comprising receiving a communication linked to a pointer data from an electronic device, by a central interface system is enabled by an offline communication made through a separate communication device, wherein the offline communication made is a communication including a phone call, a SMS, a MMS, electronic communication, a an email, and a combination thereof.

The data in the text fields or data entry field may be submitted using various pointer data that is generated and with the aid of the remote entering/submitting mechanism using the generated pointer data to perform the act of entering/submitting. Thus, unique identity of the remote entering/submitting mechanism may be captured by the central interface system. The user is prompted to connect to the central interface system, proactively, by means of the remote entering/submitting mechanism and by using the generated pointer data. Such unique identity may be unique to a user or unique to a session. Such unique identity may or may not be stored in the system.

According to this invention, there is also provided an encryption system and method adapted to encrypt communication. The communication may be any data communication over a wired communication channel, a wireless communication channel, a telecommunication communication channel, an Internet communication channel, a network communication channel, or the like. The encryption system provides a solution for a safe and secure authentication system and method. Also, this invention provides an encryption system and method for data entering and submission for an online interface using a remote entering/submitting mechanism in an encrypted and authorized manner.

Figure 2:
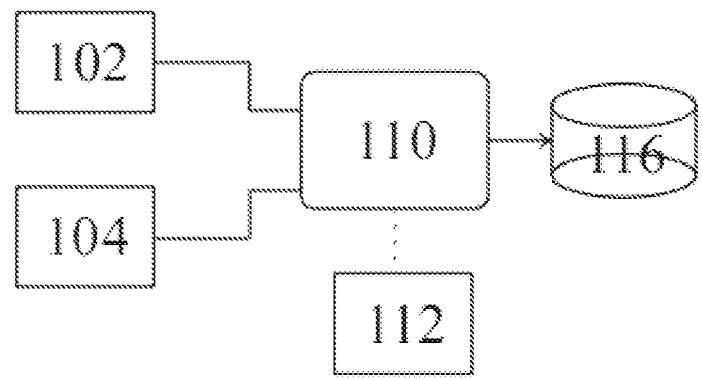

FIG. 2 illustrates a schematic of the encryption system adapted to encrypt communication.

In accordance with en embodiment of this invention, there is provided a first input means (102) adapted to allow a user to input an identity. The identity is a user-generated identity. This identity without limitation may be a text based identity. This identity may or may not be stored by the system of this invention.

In accordance with another embodiment of this invention, there is provided a second input means (104) adapted to allow an input of a voice data in the user's own voice. A user may be prompted to speak in to an audio receipt component of the system. A voice detection mechanism identifies/extracts key parameters from the received voice data in order to determine the uniqueness of the voice data and the corresponding user.

Alternatively, each user may be provided with a specific user-defined or system-defined text data which is unique to the user. The system may be trained only to receive the user-defined or system-defined text or any data in the voice of the user, in full or in part, in order to recognize a user.

In accordance with an additional embodiment of this invention, there is provided a unique code generation means (110) adapted to generate a unique code whenever a user generates a request for communication. The unique code is generated by an encryption algorithm which receives the first input data and the second input data. The unique code is a derivative of the first input data and the second input data in correlation with the parameters defined by the encryption algorithm for encrypting. This unique code generation means is a real time unique code generation means which generates the unique code in real time. The real time unique generated code may be an alphanumeric code. The real time unique generated code may be a voice captcha code based on previously stored or trained second registration data. The generated unique code may be stored in a database (116) in encrypted manner in order to reference a user for all authorization.

The system uses this real time unique code for storage and verification, while the first input data and the second input data is not stored anywhere in the system or the database (116), and every time a real time unique code will be generated, temporarily stored and verified in encrypted manner for authorization. This ensures protection from hacking or reverse engineering.

In accordance with yet an additional embodiment of this invention there may be provided a computation means (112) adapted to create a verification code in accordance with the code that is to be received from the user for the purposes of matching. This verification code is also the same combination that the unique code generation means (110) intends to create. This verification code may be generated in real time.

The data, in each of the means of the system and method of this invention, may be 'encrypted' and suitably 'decrypted' as and when required.

In an embodiment of the invention, the systems and methods of the present invention are made applicable to a do-not-disturb (DND) mode registry or a do-not-disturb mode enabled device.

In an embodiment of the invention, the systems of the present invention comprise a do-not-disturb mode detection component, which may be linked to a do-not-disturb registry.

In an embodiment of the invention, the methods of the present invention comprise the step of identifying whether an electronic device is enabled or activated with a DND mode.

In an embodiment of the invention, the absence of clickable submit button or other means of allowing a user to enter/submit the data on the said online interface, induces a user to voluntarily establishing communication with a vendor or caller thereby circumventing the restriction created by DND mode.

The term 'do-not-disturb' (DND) or DND mode means a mode activated on a telecommunication device which prevents communication to the said device by a set of vendors or callers, said vendors or callers typically intending to initiate communication with consumers in general for commercial or advertising purposes. The said communication is typically telephonic calls or instant messages or SMS. The term 'do-not-disturb' can be alternately used instead of the term 'do-not-call'. Any registry indexing one or more of such DND mode activated telecommunication devices may be referred to as a DND Registry. A DND Registry is deemed to include a 'Customer Call Preference Registry' or a 'Do not Call' registry.

In an embodiment of the invention, the systems of the present invention further comprise a parallel communication triggering component. The parallel communication triggering component is capable of initiating a communication between the user of the system and a second person or second system such as but not limited to a telecommunication system or an Interactive voice response system (IVR), said communication being initiated either before or during or after the step of submission of data is being enabled. In an embodiment of the invention, said communication may be made by employing a pointer parameter to determine the second person or second system to which the communication is being made.

In an embodiment of the invention, the systems and methods of the present invention may allow a parallel communication triggering based on the pointer data or pointer parameter of the first level of data, and may be triggered prior to or simultaneous to or subsequent to the submission of data by submission component.

In an embodiment of the invention, the systems and methods of the present invention may identify or authenticate or store or match a voice print. A voice print may be a graphic representation of a person's voice, showing the component frequencies as analyzed by a sound spectrograph.

In an embodiment of the invention, the systems and methods of the present invention may involve or be coupled with or incorporate additional systems or methods for user tracking. For the purpose of this invention, 'user tracking' or 'tracking a user' involves tracking of or recording of or storing and transferring data of activities or behavior or preferences or intent of a user. Examples of activities may be selected from but not limited to series of clicks, access of links, access of advertisements, shopping activities, downloading of information, uploading of information, social network activities, RSS Feeds Subscription. Preference of a user may be derived from the history of user activity or the user profile details. Intent of a user may be a prediction of the interest or requirement of a user based on an algorithm for enabling such prediction. Based on user tracking, the pointer parameter may be designated. Also, the system may further comprise of a 'user tracking data transfer component' which is capable of transferring or submitting user tracking data to the data submission server. User tracking can in turn be used to facilitate 'advertisement tracking' which shall enable derivation of analytics or details or performance measuring of one or more advertisements linked directly or indirectly to user tracking.

In an embodiment of the invention, the systems and methods of the present invention may involve or be coupled with or incorporate additional systems or methods for Ecommerce user Credit Rating or Ecommerce User Credit Rating Registry. The term 'Ecommerce User Credit Rating' shall mean a rating or grading or credibility points assigned to an identity such as but not limited to name, telephone no, email address, registration number or the like, based on a person's activity pattern or default pattern or fraud pattern in respect of payment delays or payment defaults for either partial payments or full payments or repeated instances of try & return of goods, wherein pattern may be data linked to a series of activities. This may extend to Cash on Delivery systems or Collect on Delivery systems or Try & Return schemes.

In an embodiment of the invention, the systems and methods of the present invention may involve or be coupled with or incorporate additional systems or methods for Unethical User Tracking System (UEUTS).

In an embodiment of the invention, the systems and methods of the present invention may involve or be coupled with or be linked to any registry.

The term 'pre-defined' with respect to a component or data or item or program means that a particular identity or indicia is defined at an instant prior to the instant of using the component or data or item or program.

The term 'pre-registered' with respect to a component or data or item or program means that indexing or registration of the component or data or item or program is done at an instant prior to the instant of using the component or data or item or program.

The term 'pre-populated' with respect to a component or data or item or program means that clustering or clubbing or populating of the component or data or item or program is done at an instant prior to the instant of using the component or data or item or program.

The terms 'pointer' and 'pointer data' can be alternatively and interchangeably used for the purpose of this invention.

In accordance with an embodiment of this invention, data entering and submission is a means to input data as well as access data.

The systems of the present invention in an embodiment are made accessible through a portal or an interface which is a part of, or may be connected to, the internet or World Wide Web or any similar portal, wherein the portals or interfaces are accessed by one or more of users through an electronic device, whereby the user may send and receive data to the portal or interface which gets stored in at least one memory device or at least one data storage device or at least one server, and utilizes at least one processing unit. The portal or interface in combination with one or more of memory device, data storage device, processing unit and serves, form an embedded computing setup, and may be used by, or used in, one or more of a computer program product. In an embodiment of the invention, the embedded computing setup and optionally one or more of a computer program product, in relation with, and in combination with the said portal or interface forms one of the systems of the invention. Typical examples of a portal or interface may be selected from but is not limited to a website, an executable software program or a software application.

In an example of the invention, a user through a personal computer fills a web page based online enquiry form with the details of his name, contact details and enquiry summary on a commercial website but cannot submit the data by using any key on the keyboard of his personal computer, nor is a clickable submitted button allowed on the webpage. The webpage displays a pointer data in the form of a telephone number to which the user is required to call. The user calls the telephone number through his mobile phone, and the pointer data is communicated to the central interface system, and the submission component submits the said online enquiry form remotely.

In an example of the invention, a user through a personal computer fills a web page based online enquiry form with the details of his name, contact details and enquiry summary on a commercial website but cannot submit the data by using any key on the keyboard of his personal computer, nor is a clickable submitted button allowed on the webpage. The webpage displays a pointer data in the form of a keyword to be sent via a text message or SMS to a telephone number by the user. The user sends a text message containing the keyword to the telephone number through his mobile phone, and the pointer data is communicated to the central interface system, and the submission component submits the said online enquiry form remotely.

In an example of the invention, a user through a personal computer fills a web page based online enquiry form with the details of his name, contact details and enquiry summary on a commercial website but cannot submit the data by using any key on the keyboard of his personal computer, nor is a clickable submitted button allowed on the webpage. The webpage displays a pointer data in the form of a QR Code to be scanned and sent to an email address by the user. The user sends an email containing the scanned QR code through by opening another webpage containing email interface on the personal computer and the pointer data is communicated to the central interface system, and the submission component submits the said online enquiry form remotely.

In an example of the invention, a user through a personal computer fills a web page based online enquiry form with the details of his name, contact details and enquiry summary on a commercial website but cannot submit the data by using any key on the keyboard of his personal computer, nor is a clickable submitted button allowed on the webpage, as soon as the system identifies that the user's phone is activated with DND Mode. The webpage displays a pointer data in any of the forms mentioned in the above examples.

In an example of the invention, a user while logging into his email interface is required to first enter his login ID then authenticate himself/herself by voice enabled password, which acts as the pointer data and shall trigger remote submission and authentication of the user to allow access to his/her email interface. The webpage displays a pointer data in the form of a telephone number to which the user is required to call and speak a word in his own voice. The user calls the said telephone number and speaks the word in his own voice, which is encrypted using the encryption mechanism of one of the embodiments of the system and then matched and authenticated to allow the submission of the entered data and allow access of the email interface to the user. If the user speaks a wrong word or a person other than the user speaks a word in the call to the telephone number, then the further process will cease and user will be denied access to email interface.

In an embodiment of the invention, the systems and methods of the invention may simultaneously involve more than one user or more than one data storage device or more than one host server or any combination thereof.

In an embodiment of the invention, a user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, pointing stick, or any combination thereof.

In an embodiment of the invention, the systems and methods can be practiced using any electronic device which may be connected to one or more of other electronic device with wires or wirelessly which may use technologies such as but not limited to, Bluetooth, WiFi, Wimax. This will also extend to use of the aforesaid technologies to provide an authentication key or access key or electronic device based unique key or any combination thereof.

In an embodiment of the invention, the systems and methods can be practiced using any electronic device which may contain or may be infected by one or more of an undesirable software such as but not limited to a virus, or a Trojan, or a worm, malware, spyware, adware, scareware, crimeware, rootkit or any combination thereof.

In an embodiment of the invention the system may involve software updates or software extensions or additional software applications.

In an embodiment of the invention one or more user can be blocked or denied access to one or more of the aspects of the invention.

The term 'encrypt' or 'encryption' means the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content is performed in accordance with an encryption/decryption algorithm. The encryption/decryption algorithm utilized is not hardware dependent and may change depending on the digital content. For example, a different algorithm may be utilized for different websites or programs. The term 'encryption further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

In an embodiment of the invention the term network means a system allowing interaction between two or more electronic devices, and includes any form of inter/intra enterprise environment such as the world wide web, Local Area Network (LAN), Wide Area Network (WAN), Storage Area Network (SAN) or any form of Intranet.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, portable media players and personal digital assistants.

In an embodiment of the invention, computer program code for carrying out operations or functions or logic or algorithms for aspects of the present invention may be written in any combination of one or more programming languages which are either already in use or may be developed in future, such as but not limited to Java, Smalltalk, C++, C, Foxpro, Basic, HTML, PHP, SQL, Javascript, COBOL, Extensible Markup Language (XML), Pascal, Python, Ruby, Visual Basic .NET, Visual C++, Visual C# .Net, Python, Delphi, VBA, Visual C++ .Net, Visual FoxPro, YAFL, XOTcl, XML, Wirth, Water, Visual Dialog-Script, VHDL, Verilog, UML, Turing, TRAC, TOM, Tempo, Tcl-Tk, T3X, Squeak, Specification, Snobol, Smalltalk, S-Lang, Sisal, Simula, SGML, SETL, Self, Scripting, Scheme, Sather, SAS, Ruby, RPG, Rigal, Rexx, Regular Expressions, Reflective, REBOL, Prototype-based, Proteus, Prolog, Prograph, Procedural, PowerBuilder, Postscript, POP-11, PL-SQL, Pliant, PL, Pike, Perl, Parallel, Oz, Open Source, Occam, Obliq, Object-Oriented, Objective-C, Objective Caml, Obfuscated, Oberon, Mumps, Multiparadigm, Modula-3, Modula-2, ML, Miva, Miranda, Mercury, MATLAB, Markup, m4, Lua, Logo, Logic-based, Lisp (351), Limbo, Leda, Language-OS Hybrids, Lagoona, LabVIEW, Interpreted, Interface, Intercal, Imperative, IDL, Icl, ICI, HyperCard, HTMLScript, Haskell, Hardware Description, Goedel, Garbage Collected, Functional, Frontier, Fortran, Forth, Euphoria, Erlang, ElastiC, Eiffel, E, Dylan, DOS Batch, Directories, Declarative, Dataflow, Database, D, Curl, C-Sharp, Constraint, Concurrent, Component Pascal, Compiled, Comparison and Review, Cocoa, CobolScript, CLU, Clipper, Clean, Clarion, CHILL, Cecil, Caml, Blue, Bistro, Bigwig, BETA, Befunge, BASIC, Awk, Assembly, ASP, AppleScript, APL, Algol 88, Algol 60, Aleph, ADL, ABEL, ABC, or similar programming languages.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude or rule out the presence or addition of one or more other features, integers, steps, operations, elements, components, and/or groups thereof.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

In addition to the embodiments and examples shown, numerous variants are possible, which may be obvious to a person skilled in the art relating to the aspects of the invention.

In an embodiment of the invention, the algorithm or logic or program or code associated with encryption systems and methods may be maintained in a device which is separate from the device or server in which the encryption systems and methods are enabled.

In an embodiment of the invention the systems and methods of the present invention can be used and made applicable for any online or network based activities such as but not limited to monetary transactions, online shopping, social networks, emails, chatting, on-line gaming sessions, messaging, multimedia-conferencing, application-sharing, e-voting, group-ware & collaboration, blogging, or any combination thereof.

In an embodiment of the invention, the algorithm used for encryption may have the following formula:

$$ALG = ALG1(op1)ALG2(op2)ALG3 \ldots (opN)ALGN+1,$$

where ALG stands for an algorithm which may be a single set of instruction that may be enabled using a computer language n=1 to infinity and "op" stands for a functional operator including but not limited to logical operator or mathematical operator or comparative operator or string based operator, data and time operators.

In an embodiment of the invention, the encryption algorithm may be different for different systems.

In an embodiment of the invention, any action or process related to the systems and methods in accordance with the present invention, may execute entirely on a user's computing device, partly on a user's computing device, as a stand-alone software package, partly on a user's computing device and partly on a remote computing device or entirely on the remote computer or a server.

In an embodiment of the invention a user input is anything or any data or metadata provided by a user actively and with the users knowledge in the form of one or more alphabets or characters or any string or any computer program or any computer file.

In an embodiment of the invention, the systems and methods of the present invention may involve and provide methods to run self check, trouble shooting or program debugging.

A user is any person, machine or software that uses or accesses one or more of the systems or methods of the present invention. A user includes an automated computer program and a robot.

In an embodiment of the invention, the said code may have a combination of numeric or alphanumeric or symbolic characters used for protected and restricted access provided to a user to one or more digital systems or function or data, provided after necessary authentication or identification of the user.

In an embodiment of the invention, the encryption mechanism can be used by enabling a plugin or application or an icon or a bookmark on a website or a software or any graphical user input that is used for the systems and methods in accordance with the present invention.

In an embodiment of the invention, the encryption mechanism further comprises of one or more components which can be combined with one or more of other components of the mechanism in any combination, in an encrypted or unencrypted state, to generate an encryption key.

In an embodiment of the invention, the systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, mobile phones, laptops, palmtops, portable media players and personal digital assistants.

In an embodiment of the invention, the systems and methods of the present invention provides or enables a user interface which may allow commands for a command line interface and/or a graphical user interface (GUI) enabling a user to create, modify and delete data or metadata or program or logic or algorithm or parameters associated with encryption method or encryption program or encryption language.

In an embodiment of the invention, the system may involve software updates or software extensions or additional software applications.

In an embodiment of the invention, any form of internet security such as but not limited to, a firewall or antivirus or antimalware or registry protection can be used by a user in the same or different electronic device either simultaneously or separately, along with the systems or methods of the present invention.

In an embodiment of the invention, one or more user can be blocked or denied access or be required to reattempt access, to one or more of the aspects of the invention.

In an embodiment of the invention, a user may have a system to record or send alert or be informed in case any other user is accessing the user's electronic device remotely.

In an embodiment of the invention, the systems and methods of the invention may simultaneously involve more than one user or more than one data storage device or more than one host server or any combination thereof.

In an embodiment of the invention, the systems and methods of the present invention are used to prevent or restrict hacking or related phenomenon such as but not limited to phishing, man in the middle attack, inside jobs, rogue access points, back door access, use of viruses and worms, use of trojan horses, denial of service attack, sniffing, spoofing, ransomware or any combination thereof.

While this description has disclosed certain specific embodiments of the present invention for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

I claim:

1. A system for data entering and submission for an online interface using a remote entering/submitting mechanism, said system comprising:
   a. at least one data entry field in the online interface for receiving the data from a user;
   b. a remote entering/submitting mechanism coupled to the online interface, said remote entering/submitting mechanism comprising:
      i. a pointer generating or retrieving system adapted to generate a pointer data to be displayed on the online interface, wherein the pointer data is a combination of alphanumeric characters or other symbols which represent a specific identifiable characteristic and includes a communication address to which a communication is to be established, wherein the pointer data is generated based on an approach adopted by the user to land on the online interface, and wherein said approach adopted by the user is selected from a group consisting of clicking on an advertisement on any web-site, mobile site, mobile app or search engine results' page or clicking an advertisement on another webpage;
      ii. a central interface system adapted to receive the communication linked to the pointer data from an electronic device associated with the user;
      iii. a pre-populated database coupled to the pointer generating or retrieving system and comprising one or more pointer data which are pre-defined; and
      iv. a central database adapted to store correlative information in relation to one or more pre-defined pointer data; and
   c. submission component capable of submitting the data received at the at least one data entry field, after receiving the communication, linked to the pointer data, from the electronic device;
   wherein there is no other means of allowing the user to enter/submit the data on the said online interface; and
   wherein the data shall not be submitted by the submission component unless the communication in response to the pointer data has been established with the central interface system by the user using the electronic device through a medium/interface other than the said online interface.

2. The system for data entering and submission for an online interface using a remote entering/submitting mechanism of claim 1, wherein the said system further comprises of:
   a. a first input means adapted to allow a user to input an identity entered through said at least one data entry field in an online interface, as a first input data;
   b. a second input means adapted to allow the user to input a voice data in the user's own voice entered through an electronic device, as a second input data;
   c. a unique code generation means adapted to generate a unique code whenever the user generates a request for the communication, said unique code being generated by an encryption algorithm which receives the first input data and the second input data, said unique code being a derivative of the first input data and the second input data in correlation with parameters defined by the encryption algorithm for encrypting;
   d. a database of generated unique codes in encrypted manner in order to reference a user for all authorization;
   e. a computation means adapted to create/retrieve a verification code in accordance with the code that is to be received from the user for the purpose of matching; and
   f. a matching means for matching the input data or verification code created by the computation means.

3. The system for data entering and submission for an online interface using a remote entering/submitting mechanism of claim 2, wherein a second input means is adapted to allow an input of a voice data in the user's own voice; and
   wherein the user is prompted to speak in to an audio receipt component of the system; and
   wherein a voice detection mechanism identifies/extracts key parameters from the received voice data in order to determine the uniqueness of the voice data and the corresponding user.

4. The system for data entering and submission for an online interface using a remote entering/submitting mechanism of claim 2, wherein, each user is provided with a specific user-defined or system-defined text data which is unique to the user; and wherein the system is capable of receiving the user-defined or system-defined text or any data in the voice of the user, in full or in part, in order to recognize a user.

5. The system for data entering and submission for an online interface using a remote entering/submitting mechanism of claim 2, wherein the second input means is adapted to allow an input of a data other than voice data.

6. The system for data entering and submission for an online interface using a remote entering/submitting mechanism of claim 1, further comprising:
   a. a device for facilitating the remote entry or remote submission; and b. an acknowledgement means adapted to acknowledge the communication from the electronic device in relation to the generated pointer.

7. The system for data entering and submission for an online interface using a remote entering/submitting mechanism of claim 1, wherein the said system further comprise of a system for allowing a user to input or submit data into a form or a data input interface on an online interface by way of an offline communication made through a separate communication device, wherein the offline communication made is a communication including a phone call, a SMS, a MMS, electronic communication, a an email, and a combination thereof.

8. The system for data entering and submission for an online interface using a remote entering/submitting mechanism of claim 1, further comprises a feature of using a mode of a user/data authentication or verification using biometric identity related code of a user.

9. The system for data entering and submission for an online interface using a remote entering/submitting mechanism of claim 1, wherein the electronic device is selected from a group comprising a phone, a cell phone, a mobile phone, a phone, telecommunication enabled data entry device, Internet enabled data entry device, wireless communication based data entry device, wired communication based data entry device and a combination thereof.

10. The system for data entering and submission for an online interface using a remote entering/submitting mechanism of claim 1, wherein said specific identifiable characteristic is selected from a group comprising a telephone number, a mobile number, SMS Keyword, Short Code, extension number, numerical input after connecting to a call, email ID, PIN (personal identification number) number, TIN (Telephone Identification Number), a URL (uniform resource locator), a QR code (Quick Response Code), a hint or secret question, a captcha enabled access, an image, a sound or music based communication, a puzzle, a hint statement, and a combination thereof.

11. The system for data entering and submission for an online interface using a remote entering/submitting mechanism of claim 1, wherein the pointer data is distinct and unique in association to a pointer parameter, such that the pointer data is used to indicate and identify the pointer parameter; and
wherein the pointer parameter is selected from the group comprising particular webpage where the pointer data is displayed; geographical location of a user, time of display; other identifiable parameters which are particularly used for user tracking or user verification or user authentication; and combinations thereof.

12. The system for data entering and submission for an online interface using a remote entering/submitting mechanism of claim 1, wherein the data in the text fields is submitted using various pointer data that are generated and with the aid of the remote entering/submitting mechanism using the generated pointer data to perform the act of entering/submitting; and
wherein a unique identity of the remote entering/submitting mechanism is captured by the central interface system.

13. The system for data entering and submission for an online interface using a remote entering/submitting mechanism of claim 12, wherein the unique identity is not stored the system.

14. The system for data entering and submission for an online interface using a remote entering/submitting mechanism of claim 1, the system further comprises of a parallel communication triggering component.

15. A method for data entering and submission for an online interface using a remote entering/submitting mechanism, the method comprising the steps of:
a. entering data in a data entry field in an online interface system by a user;
b. generating or retrieving a pointer data by a pre-populated database to be displayed on the online interface system, wherein the pointer data is a combination of alphanumeric characters or other symbols which represent a specific identifiable characteristic and includes a communication address to which a communication is to be established, wherein the pointer data is generated or retrieved based on an approach adopted by the user to land on the online interface, and wherein said approach adopted by the user is selected from a group consisting of clicking on an advertisement on any web-site, mobile site, mobile app or search engine results' page or clicking an advertisement on another webpage;
c. displaying the pointer data on the online interface system;
d. receiving, by a central interface system, a communication linked to the pointer data from an electronic device associated with the user; and
e. submitting, by a submission component, the data after receiving the communication, linked to the pointer data, from the electronic device;
wherein there is no other means of allowing the user to enter/submit the data on the said online interface; and
wherein the data shall not be submitted by the submission component unless communication in response to the pointer data has been established with the central interface system by the user using the electronic device through a medium/interface other than the said online interface.

16. The method for data entering and submission for an online interface using a remote entering/submitting mechanism of claim 15, further comprising the steps of:
a. acknowledging the communication from the electronic device in relation to the generated pointer; and
b. storing of correlative information in relation to various types of pre-defined pointer data.

17. The method for data entering and submission for an online interface using a remote entering/submitting mechanism of claim 15, wherein said method further comprises a method adapted to encrypt communication comprising the steps of:
a. inputting an identity as a first input data by a user by a first input means;
b. inputting a voice data in the user's own voice as a second input data by a second input means;
c. generating a unique code by a unique code generation means whenever the user generates a request for a communication, said unique code being generated by an encryption algorithm which receives the first input data and the second input data, said unique code being a derivative of the first input data and the second input data in correlation with parameters defined by the encryption algorithm for encrypting;
d. storing the generated unique codes in encrypted manner in order to reference a user for all authorization in a database;
e. creating/retrieving a verification code in accordance with the code that is to be received from the user for purposes of matching by a computation means; and f. matching the verification code or first input data by a matching means.

18. The method for data entering and submission for an online interface using a remote entering/submitting mechanism of claim 15, wherein receiving a communication linked to a pointer data from an electronic device, by a central interface system is enabled by an offline communication made through a separate communication device, wherein the offline communication made is a communication including a phone call, a SMS, a MMS, electronic communication, a an email, and a combination thereof.

19. The method for data entering and submission for an online interface using a remote entering/submitting mechanism of claim 15, wherein said specific identifiable characteristic is selected from a group comprising a telephone number, a mobile number, SMS Keyword, Short Code, extension number, numerical input after connecting to a call, email ID, PIN (personal identification number) number, TIN (Telephone Identification Number), a URL (uniform resource locator), a QR code (Quick Response Code), a hint or secret question, a captcha enabled access, an image, a sound or music based communication, a puzzle, a hint statement, and combination thereof.

20. The method for data entering and submission for an online interface using a remote entering/submitting mechanism of claim 15, wherein the pointer data is distinct and unique in association to a pointer parameter, such that the pointer data is used to indicate and identify the pointer parameter; and wherein the pointer parameter is selected from the group comprising particular webpage where the pointer data is displayed; geographical location of a user, time of display; other identifiable parameters which are particularly used for user tracking or user verification or user authentication; and combinations thereof.

21. The method for data entering and submission for an online interface using a remote entering/submitting mechanism of claim 15, wherein the data in the text fields is submitted using various pointer data that are generated and with the aid of the remote entering/submitting mechanism using the generated pointer data to perform the act of entering/submitting; and wherein a unique identity of the remote entering/submitting mechanism is captured by the central interface system.

22. The method for data entering and submission for an online interface using a remote entering/submitting mechanism of claim 15, additionally comprising the step of initiating a communication between the user of the system and a second person or a second system using a parallel communication triggering component.

23. A computer program product for data entering and submission for an online interface using a remote entering/submitting mechanism, the computer program product embodied in a computer readable medium that, when executing on a computer, performs steps comprising
  a. entering data in a data entry field in an online interface system by a user;
  b. providing a remote entering/submitting mechanism comprising a device for facilitating the remote entry or remote submission;
  c. generating/retrieving pointer data to be displayed on the online interface system, wherein the pointer data is a combination of alphanumeric characters or other symbols which represent a specific identifiable characteristic and includes a communication address to which a communication is to be established, wherein the pointer data is generated or retrieved based on an approach adopted by the user to land on the online interface, and wherein said approach adopted by the user is selected from a group consisting of: clicking on an advertisement on any web-site, mobile site, mobile app or search engine results' page or clicking an advertisement on another webpage;
  d. pre-populating a database comprising the pointer data which are pre-defined for the use of the method;
  e. receiving communication from the device in response to generated pointer data, wherein the data shall not be submitted unless communication in response to the pointer data has been established using an electronic device through a medium/interface other than the said online interface;
  f. acknowledging communication from the device in relation to the generated pointer; and
  g. storing correlative information in relation to various types of pre-defined pointer data, wherein the various types of the pre-defined pointer data corresponds to respective different approaches adopted by user to land on the online interface system.

* * * * *